(12) United States Patent
Endoh et al.

(10) Patent No.: US 7,548,505 B2
(45) Date of Patent: Jun. 16, 2009

(54) OPTICAL RECORDING MEDIUM HAVING A RELATIONSHIP BETWEEN GROOVE WIDTH AND TRACK PITCH

(75) Inventors: Sohmei Endoh, Tokyo (JP); Tadao Suzuki, Tokyo (JP); Jun Shimizu, Tokyo (JP); Jun Nakano, Tokyo (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 10/484,197

(22) PCT Filed: Jul. 18, 2002

(86) PCT No.: PCT/JP02/07314

§ 371 (c)(1),
(2), (4) Date: Sep. 23, 2004

(87) PCT Pub. No.: WO03/009284

PCT Pub. Date: Jan. 30, 2003

(65) Prior Publication Data
US 2005/0030881 A1 Feb. 10, 2005

(30) Foreign Application Priority Data
Jul. 18, 2001 (JP) .............................. 2001-218409

(51) Int. Cl.
*G11B 7/24* (2006.01)
(52) U.S. Cl. .................................................. 369/275.4
(58) Field of Classification Search .................... None
See application file for complete search history.

(56) References Cited

U.S. PATENT DOCUMENTS

| | | | | |
|---|---|---|---|---|
| 5,972,459 A * | 10/1999 | Kawakubo et al. | ....... | 369/275.1 |
| 6,054,199 A * | 4/2000 | Sugiyama et al. | ........ | 369/275.4 |
| 6,097,695 A * | 8/2000 | Kobayashi | ................ | 369/275.4 |
| 6,207,247 B1 * | 3/2001 | Morita | ....................... | 428/64.1 |
| 6,246,656 B1 * | 6/2001 | Kawakubo et al. | ..... | 369/112.23 |
| 6,254,966 B1 * | 7/2001 | Kondo | ......................... | 428/156 |
| 6,653,057 B1 * | 11/2003 | Koyama | ..................... | 430/320 |
| 6,661,770 B2 * | 12/2003 | Kakuta et al. | ............ | 369/275.4 |
| 6,697,323 B1 * | 2/2004 | Miki | ........................ | 369/275.1 |
| 6,700,862 B2 * | 3/2004 | Tsukuda et al. | ........... | 369/275.4 |
| 6,814,897 B2 * | 11/2004 | Morita | ....................... | 264/1.33 |
| 6,874,262 B2 * | 4/2005 | Nishiyama et al. | ............ | 40/321 |
| 6,967,048 B2 * | 11/2005 | Saito et al. | .................. | 428/64.1 |
| 7,129,019 B2 * | 10/2006 | Kakuta et al. | ............ | 369/275.5 |
| 7,154,843 B2 * | 12/2006 | Nakano et al. | ........... | 369/275.4 |
| 7,167,436 B2 * | 1/2007 | Koyama et al. | .......... | 369/275.3 |
| 7,197,005 B2 * | 3/2007 | Kato et al. | ................ | 369/275.4 |

(Continued)

FOREIGN PATENT DOCUMENTS

EP 0 880 130 A2 11/1998

(Continued)

*Primary Examiner*—Tan X Dinh
(74) *Attorney, Agent, or Firm*—Oblon, Spivak, McClelland, Maier & Neustadt, P.C.

(57) ABSTRACT

An optical recording/reproducing medium having grooves formed along recording tracks and used for recording/reproducing when irradiated with light L with a specified wavelength $\lambda$, wherein the track pitch p of a groove is at least 200 nm and up to 350 nm, and a ratio $w_g/p$ between the width $w_g$ of a groove and a track pitch p is at least 0.24 and up to 0.67.

11 Claims, 9 Drawing Sheets

U.S. PATENT DOCUMENTS

| | | | |
|---|---|---|---|
| 7,242,662 B2 * | 7/2007 | Endoh et al. | 369/275.4 |
| 2001/0003384 A1 * | 6/2001 | Morita | 264/219 |
| 2001/0012265 A1 * | 8/2001 | Nishiyama et al. | 369/275.4 |
| 2005/0141404 A1 * | 6/2005 | Ootera et al. | 369/275.4 |

FOREIGN PATENT DOCUMENTS

| | | | |
|---|---|---|---|
| EP | 0 911 820 A1 | | 4/1999 |
| EP | 1 403 859 A1 | | 3/2004 |
| JP | 63-288439 | | 11/1988 |
| JP | 1-171820 | | 7/1989 |
| JP | 2-204023 | * 8/1990 | 430/321 |
| JP | 05-198016 | | 8/1993 |
| JP | 08-221827 | | 8/1996 |
| JP | 8-273202 | | 10/1996 |
| JP | 09-147429 | | 6/1997 |
| JP | 10-188285 | | 7/1998 |
| JP | 10-320774 | | 12/1998 |
| JP | 2000-067465 | | 3/2000 |
| JP | 2000-067468 | | 3/2000 |
| JP | 2000-108520 | | 4/2000 |
| JP | 2000-207787 | | 7/2000 |
| JP | 2000-231011 | | 8/2000 |
| JP | 2000-231730 | | 8/2000 |
| JP | 2000-306271 | | 11/2000 |
| JP | 2000-334744 | | 12/2000 |
| JP | 2001-006221 | | 1/2001 |
| JP | 2001-084591 | | 3/2001 |
| JP | 2001-134938 | | 5/2001 |
| WO | WO 97/37348 | | 10/1997 |

* cited by examiner

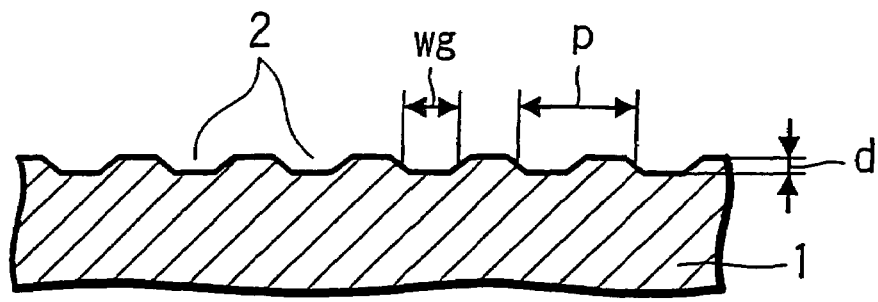
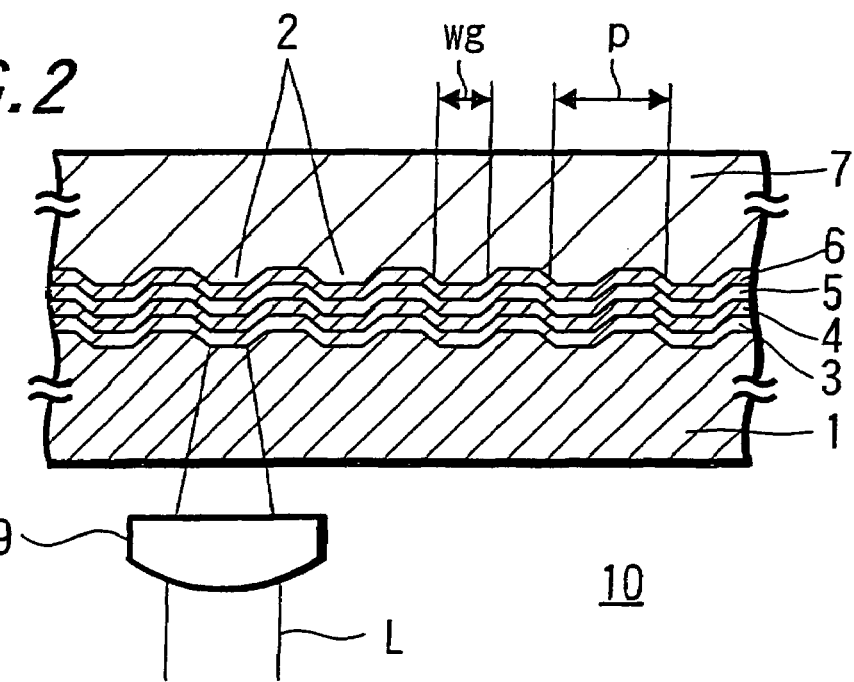

OPTICAL RECORDING MEDIUM HAVING A RELATIONSHIP BETWEEN GROOVE WIDTH AND TRACK PITCH

TECHNICAL FIELD

The present invention relates to an optical recording and reproducing medium substrate suitable, a manufacturing method of optical recording and reproducing medium manufacturing stamper and an optical recording and reproducing medium manufacturing stamper for use with an optical recording and reproducing medium having grooves formed along recording tracks.

BACKGROUND ART

Various kinds of optical disks shaped like discs for optically recording and/or reproducing information are put into practical use as optical recording and reproducing mediums. A read-only optical disk having embossed pits formed on a disk substrate beforehand, a magneto-optical disk for recording data by magneto-optical effect and a phase-change optical disk for recording data by phase-change of a recording film are available as such optical disks.

Of these optical disks, in the optical disk in which data can be written, such as a magneto-optical disk and a phase-change optical disk, it is customary to form grooves extending along recording tracks on a disk substrate. The grooves are so-called guide grooves formed along recording tracks in order to make mainly tracking servo, and an opening end between the grooves is referred to as a land.

In the optical disk with the grooves being formed thereon, it is customary to make tracking servo by using a tracking error signal based upon a push-pull signal obtained from light reflected and deflected on the grooves. The push-pull signal is calculated as a difference between outputs of two photo-detectors located symmetrically across the center of the track, for example, after the two photo-detectors have detected light reflected and diffracted on the groove.

In these optical disks, high recording density has been achieved so far by improving reproduction resolution of an optical pickup mounted on a reproducing apparatus. Then, improvement of the reproduction resolution of the optical pickup has been optically realized so far by reducing a wavelength λ of laser light for use in mainly reproducing data or by increasing a numerical aperture NA of an objective lens for converging laser light on the optical disk.

In the respective conventional formats of a so-called CD-R available as a write-once type CD (Compact Disc), an MD (Mini Disc) available as a rewritable magneto-optical disk, a DVD-R available as a write-once DVD (Digital Versatile Disc) or a DVD+RW or DVD-RW available as a rewritable DVD (these trade names are all registered trademarks of optical disks), the groove widths most suitable for the recording and reproducing characteristics are different depending upon factors such as properties of recording films and characteristics of servo signals.

In the ordinary optical disk manufacturing process, when a stamper for use in molding its substrate is manufactured, a photoresist is coated on a master substrate and the above-mentioned pits and grooves are formed by so-called photolithography using pattern exposure and development. Hence, the groove width is determined by a diameter of a beam spot of exposure beam.

When a master of an optical recording and reproducing medium such as the above-mentioned CD-R and CD-RW is recorded by one exposure beam, pattern exposure is made by an optical recording apparatus of which schematic arrangement is shown in FIG. 13. In FIG. 13, reference numeral 20 denotes a light source formed of a He—Cd laser of gas laser using gas, for example, as an amplification medium. Laser light L emitted from this light source 20 is deflected 90° in its traveling direction by a mirror M1 and introduced into a modulation optical system 25. In the optical modulation system 25, the laser light L is reduced in diameter of beam by a condenser lens L1 and introduced into an AOM (Acousto Optical Modulator; acousto-optic modulator) 28, in which it is modulated in light intensity in response to ultrasonic waves that were modulated based upon a recording signal supplied to the AOM 28. Reference numeral 27 denotes a driving driver for inputting a signal such as an EFM signal.

The laser light L modulated by this AOM 28 is enlarged or reduced in beam diameter by a beam enlargement lens or a beam reduction lens L2, is traveled as the parallel beam and reflected by a mirror M2, thereby being introduced into a moving optical table 40 in the horizontal direction.

The moving optical table 40 includes a lens L3, for example, as a focusing and diffraction light correction optical system, a mirror M3 for directing the direction of the optical axis to the irradiated surface and an objective lens L4. The lens L3 is located on a light incident side convergence surface P2, formed at the position conjugating to the focusing condenser surface P1 of the objective lens L4, at its position in which the laser light L is to be focused.

Thereafter, the laser light L is focused on the surface of a photoresist 12 on the master substrate 11 through this focusing and diffracted light correction lens L3 and the objective lens L4 and thereby the photoresist is exposed with a predetermined pattern. The master substrate 11 is rotated as shown by an arrow b by a rotary drive means, though not shown. A dot-and-dash line c denotes a center axis of the substrate 11.

In such optical recording apparatus, the above-mentioned beam relay optical system is located between the light source 20 and the objective lens L4 to change the focal distance of the lens L2 or the lens L3 such that the objective lens L4 may focus light on the photoresist 12 and that the effective numerical aperture NA relative to the objective lens L4 may change to change the diameter of the exposure beam.

In the above-mentioned CD-R and CD-RW, concave and convex patterns of the groove are recorded by a He-Cd laser (wavelength is 442 nm), and an optimum groove width falls within a range of from 550 nm to 600 nm. Since the DVD+RW, DVD-R and DVD-RW of the high density optical disks have a recording capacity of 4.7 GB, which is high recording density as high as about 7.2 times the recording density of the CD-R and CD-RW, the optimum groove width thereof is smaller than that of the above-mentioned CD-R and the like and falls within a range of from 300 to 330 nm. Therefore, by using a Kr laser (wavelength is 413 nm) with short wavelength, the spot diameter d of exposure beam can be reduced, and hence the optimum groove width of the DVD+RW, DVD-R and DVD-RW can be realized.

The spot diameter d of the exposure beam is expressed by the following equation (1):

$$d = 1.22 \times \lambda / NA \quad (1)$$

(λ: recording wavelength, NA: numerical aperture)

In a cited patent reference 1 (official gazette of Japanese laid-open patent application No. 10-241214), a groove width that falls within a range of from about 600 nm to 800 nm can be realized by using an Ar laser (wavelength is 458 nm).

Recording wavelengths λ, track pitches, groove widths and ratios between the groove width and recording wavelength of the above-mentioned respective optical disks are shown on the following table 1.

TABLE 1

|  | Recording wavelength λ | Track pitch | Groove width | Groove width/ Rec. wavelength |
|---|---|---|---|---|
| Cited patent reference 1 | 458 nm |  | 600-800 nm | 1.31-1.75 |
| CD – R | 442 nm | 1600 nm | 600 nm | 1.36 |
| CD – RW | 442 nm | 1600 nm | 550 nm | 1.24 |
| DVD + RW | 413 nm | 740 nm | 300 nm | 0.73 |
| DVD – R | 413 nm | 740 nm | 330 nm | 0.80 |
| DVD – RW | 413 nm | 740 nm | 310 nm | 0.75 |

A study of this table 1 reveals that the ordinary density optical disks of CD-R and CD-RW have the groove widths larger than the recording wavelength (442 nm), i.e., the ratios between the groove width and the recording wavelength larger than 1.0, which is enough to expose, i.e. sensitize the photoresist in most part of the spot of exposure beam so that these groove widths can be formed relatively easily.

However, the high density optical disks of the DVD+RW, DVD-R, DVD-RW and the like have the groove widths smaller than the recording wavelength (413 nm), i.e., the ratios between the groove width and the recording wavelength smaller than 1.0 so that these groove widths cannot be formed relatively easily.

Further, with respect to the high recording density optical disks, there is proposed a format by which a groove width can be much more microminiaturized up to approximately less than 200 nm. In a DVR (Digital Video Recordable) that is under development as an ultra-high density optical disk, as FIG. 14 shows a schematic plan arrangement in a partly enlarged-scale, its format is discussed such that a groove is formed as a wobble groove, a track pitch being selected to be 325 nm and a groove width being selected to be about 150 nm. However, there has not yet been proposed an ultra-high density optical disk manufacturing method which is not only excellent in productivity in actual practice but also satisfactory in yield. In FIG. 14, reference numeral 2 denotes a groove and reference numeral 8 denotes a land.

A cited patent reference 2 (Japanese patent No. 3104699) has reported a molded substrate having a groove width less than 100 nm manufactured by a manufacturing method in which a land portion and a groove portion are inverted by using a so-called mother stamper whose concavities and convexities are inverted to those of a stamper by a duplicate of a stamper.

However, the example described in the above-described cited patent reference 2 has an extremely large land width as compared with a groove width. The following table 2 shows groove widths, land widths, track pitches and ratios between groove width and track pitch of inventive examples 1 to 3 of this cited patent reference 2 and the CD-R, CD-RW, DVD+RW, DVD-R, DVD-RW and MD, respectively.

TABLE 2

|  | Groove width | Land width | Track pitch | Groove width/ Track pitch |
|---|---|---|---|---|
| Cited patent reference 2 Inventive examples 1, 2 | 40 nm | 360 nm | 400 nm | 0.10 |
| Cited patent reference 2 Inventive example 3 | 60 nm | 290 nm | 350 nm | 0.17 |
| CD – R | 600 nm | 600 nm | 1600 nm | 0.38 |
| CD – RW | 550 nm | 600 nm | 1600 nm | 0.34 |
| DVD + RW | 300 nm | 440 nm | 740 nm | 0.41 |
| DVD – R | 330 nm | 410 nm | 740 nm | 0.46 |
| DVD – RW | 310 nm | 430 nm | 740 nm | 0.42 |
| MD | 1200 nm | 400 nm | 1600 nm | 0.75 |

As is clear from the above-described table 2, in the above-described cited patent reference 2, since the groove width is extremely small as compared with the land width, accordingly, the ratio between the groove width and the track pitch is as very small as 0.10 to 0.17 and amplitude amounts of a push-pull signal serving as a tracking servo signal and a cross-track signal (Cross Track Signal: CTS) decrease, stable tracking servo cannot be realized. Therefore, this conventional manufacturing method cannot be directly applied to an optical disk that intends to increase recording density by reducing the track pitch to less than about 350 nm.

The amplitude amount of the push-pull signal is maximized when the ratio between the groove width and the track pitch is ½, and the amplitude amount of the CTS signal is maximized when the ratio between the groove width and the track pitch is approximately ⅓ or approximately ⅔. As shown on the above-described table 2, in the commercially-available optical disks such as the CD-R, CD-RW, DVD+RW, DVD-R, DVD-RW, the ratio between the groove width and the track pitch falls within a range of from approximately 0.34% to 0.75%.

Moreover, the above-described cited patent reference 2 can realize the narrow groove width by using the inverted pattern in which an area which might serve as a future land portion is formed as the groove by the mother stamper as described above. In this case, when recording light is wobbled and the pattern is exposed to form a wobble groove, since a portion that might be formed as a future land portion is formed as a groove, different wobble signals are recorded on the left and right of the groove. There is then a risk that a leakage of a signal will occur when a wobble signal is reproduced. Thus, a problem arises, in which it will be difficult to form wobbling grooves at a level suitable for actual practice.

In view of the aforesaid aspects, it is an object of the present invention to provide an optical recording and reproducing medium, an optical recording and reproducing medium manufacturing stamper and its manufacturing method suitable for the application to high recording density optical disks such as the aforementioned DVR and which is excellent in tracking servo characteristics, in reproducing characteristics of wobble signals and which can achieve high recording density at a level suitable for actual practice.

DISCLOSURE OF THE INVENTION

The present invention is to provide an optical recording and reproducing medium substrate having grooves formed along recording tracks and in which a track pitch of a groove is selected in a range of from 200 nm to 350 nm, a ratio $w_g/p$ between a groove width $w_g$ and a track pitch p is selected in a range of from 0.24 to 0.67.

According to the present invention, in the above-mentioned optical recording and reproducing medium substrate, a groove is formed as a wobbling groove.

Further, according to the present invention, in the above-mentioned optical recording and reproducing medium substrate, a groove width $w_g$ is selected in a range of from 47 nm to 235 nm.

Furthermore, according to the present invention, in the above-mentioned respective optical recording and reproducing medium substrates, a surface roughness of a groove surface is selected in a range of from 0.4 nm to 0.85 nm.

According to the present invention, in the above-mentioned respective optical recording and reproducing medium substrates, an inclination angle of a groove side surface is selected in a range of from 15.4° to 40°.

Furthermore, according to the present invention, in the above-mentioned respective optical recording and reproducing medium substrates, a groove depth is selected in a range of from 15 nm to 30 nm.

The present invention is to provide a manufacturing method of an optical recording and reproducing medium having grooves formed along recording tracks, a manufacturing method of an optical recording and reproducing medium manufacturing stamper for molding a substrate of this optical recording and reproducing medium and an optical recording and reproducing medium manufacturing stamper that can be manufactured by this manufacturing method of optical recording and reproducing medium manufacturing stamper. A photoresist on a master substrate is exposed with a pattern corresponding to a predetermined uneven pattern and developed to manufacture an optical recording and reproducing medium manufacturing master. A width of a groove pattern corresponding to the above-mentioned groove is microminiaturized by etching a stamper transferred from this optical recording and reproducing medium manufacturing master.

Further, according to the present invention, in the above-mentioned manufacturing method of the optical recording and reproducing medium manufacturing stamper, the stamper is etched by plasma etching or reactive ion etching.

According to the present invention, gas in the above-mentioned plasma etching or the reactive ion etching is Ar gas or gas which results from mixing oxygen gas into the Ar gas.

Furthermore, according to the present invention, in the manufacturing method of the above-mentioned optical recording and reproducing medium manufacturing stamper, the track pitch of the groove pattern corresponding to the groove is selected in a range of from 200 nm to 350 nm, and a ratio $w_g'/p'$ between a groove pattern width $w_g'$ and a track pitch p' of the groove pattern is selected in a range of from 0.24 to 0.67.

Further, in the above-mentioned manufacturing method of the optical recording and reproducing medium manufacturing stamper, the width of the groove pattern of the stamper transferred from the optical recording and reproducing medium manufacturing master by etching is microminiaturized in a range of from 47 nm to 235 nm.

Furthermore, according to the present invention, in the above-mentioned respective manufacturing methods of the optical recording and reproducing medium manufacturing stamper, a surface roughness of the groove pattern surface of the stamper is selected in a range of from 0.4 nm to 0.85 nm.

According to the present invention, in the above-mentioned respective manufacturing methods of the optical recording and reproducing medium manufacturing stamper, an inclination angle of the groove pattern side surface of the stamper is selected in a range of from 15.4° to 40°.

Furthermore, according to the present invention, in the above-mentioned respective manufacturing methods of the optical recording and reproducing medium manufacturing stamper, a depth or height of the groove pattern of the stamper is selected in a range of from 15 nm to 30 nm.

Further, according to the present invention, in the above-mentioned respective manufacturing methods of the optical recording and reproducing medium manufacturing stamper, when the optical recording and reproducing medium manufacturing master is manufactured, a high gamma photoresist of which γ characteristic value is greater than 4.5 is selected as the photoresist on the master substrate.

As described above, in the optical recording and reproducing medium substrate according to the present invention, the track pitch of the groove is selected and the ratio between the groove width and the track pitch is optimized, whereby the sufficiently stable push-pull signal amplitude can be obtained in the optical recording and reproducing medium manufactured by using this substrate. Thus, there can be realized the high recording density optical recording and reproducing medium that can hold satisfactory recording and reproducing characteristics.

Further, in particular, the groove width of the optical recording and reproducing medium substrate was selected in a range of from 47 nm to 235 nm, the surface roughness of the groove surface was selected in a range of from 0.4 to 0.85 nm, the inclination angle of the groove side surface was selected in a range of from 15.4° to 40° and further the height (or depth) of the groove was selected in a range of from 15 nm to 30 nm, whereby high recording density corresponding to the above-mentioned DVD or the like could be realized. At the same time, the optical recording and reproducing medium manufactured by using this substrate could hold satisfactory recording and reproducing characteristics.

Further, when the groove of the above-described optical recording and reproducing medium substrate was formed as the wobbling groove, the wobble signal of the optical recording and reproducing medium manufactured by using this substrate could stably and satisfactorily be reproduced, and there could be obtained the high density optical recording and reproducing medium having satisfactory characteristics.

Further, according to the present invention, when the optical recording and reproducing medium substrate and the optical recording and reproducing medium manufacturing stamper were manufactured, concave and convex patterns formed on the stamper could be microminiaturized by etching the stamper transferred and formed from the optical recording and reproducing manufacturing master, and hence a narrower groove width could be realized.

In particular, plasma etching or reactive ion etching (RIE) was carried out as an etching method and Ar gas or gas which results from mixing oxygen gas into the Ar gas was used as gas for use with the etching method, whereby a groove pattern having a desired microminiaturized groove width could be formed at high accuracy.

Then, according to the above-mentioned optical recording and reproducing medium manufacturing method and the above-mentioned manufacturing method of the optical recording and reproducing medium manufacturing stamper, the track pitch of the optical recording and reproducing medium manufacturing stamper can be selected in a range of from 200 nm to 350 nm and the ratio $w_g/p$ between the groove width $W_g$ and the track pitch p can be formed in a range of from 0.24 to 0.67 at high accuracy, whereby the optical recording and reproducing medium manufactured by using the transferred substrate can be increased in recording density while satisfactory recording and reproducing characteristics being held.

In particular, the groove width $w_g$ was microminiaturized in a range of from 47 nm to 235 nm, whereby satisfactory recording and reproducing characteristics could be realized stably and reliably.

Further, according to the present invention, since the groove portion is recorded when the optical recording and reproducing medium manufacturing master is optically recorded and the microminiaturization of the groove width is realized in the succeeding stamper manufacturing process, the optical recording pattern need not be inverted, and accordingly, concavities and convexities of the recording pattern are not inverted unlike the aforementioned cited patent reference 2. Therefore, according to the present invention, it is possible to provide an optical recording and reproducing medium having satisfactory characteristics in which ordinary wobbling grooves in which wobble information are synchronized with each other on the right and left grooves can be formed easily, an optical system for use in reproducing wobble information can be prevented from becoming complex and in which a wobble signal that is satisfactory at a level suitable for actual practice can be reproduced.

BRIEF DESCRIPTION OF DRAWINGS

FIG. 1 is a schematic cross-sectional view showing an arrangement of a main portion of an example of an optical recording and reproducing medium substrate according to the present invention;

FIG. 2 is a schematic cross-sectional view showing an arrangement of a main portion of an example of an optical recording and reproducing medium;

BEST MODE FOR CARRYING OUT THE INVENTION

Figure 3A:
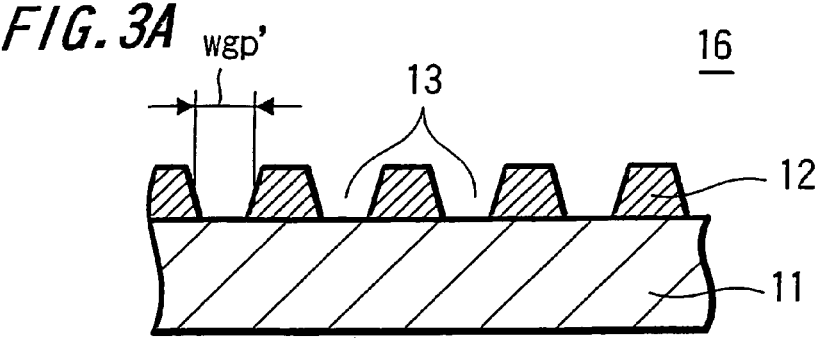
FIGS. 3A, 3B, 3C and 3D are manufacturing process diagrams showing an example of a manufacturing method of an optical recording and reproducing medium manufacturing mother stamper according to the present invention, respectively.

An embodiment of the present invention will be described below in detail with reference to the drawings. While this embodiment shows the case in which the present invention is applied to a disk-like optical recording and reproducing medium substrate, a manufacturing method of an optical recording and reproducing medium manufacturing stamper and an optical recording and reproducing medium manufacturing stamper, the present invention is not limited to the following examples and can of course take various arrangements without departing from the arrangement of the present invention.

FIG. 1 is a cross-sectional view showing an arrangement of a main portion of an example of an optical recording and reproducing medium substrate according to the present invention in an enlarged-scale. As shown in FIG. 1, in this example, a groove 2 having a width $w_g$, a track pitch p and a depth d are formed on an optical recording and reproducing medium substrate 1.

FIG. 2 is a schematic cross-sectional view showing, in an enlarged-scale, an arrangement of a main portion of an example of an optical recording and reproducing medium manufactured by using this optical recording and reproducing medium substrate. In this example, a concave-like groove 2 in the illustrated example is formed on the optical recording and reproducing medium substrate 1 at its side close to the light incident surface. On this groove, there are sequentially laminated a reflective layer 3, a first dielectric layer 4, a recording layer 5, a second dielectric layer 6 and a transmission protective layer 7 to construct the optical recording and reproducing medium.

Reference numeral 9 denotes an objective lens of an optical pickup to focus recording and/or reproducing light. Recording and/or reproducing light L such as laser light irradiates the groove 2 from the underside of the substrate 1, in this case, to read information from the groove 2.

In particular, according to the present invention, the track pitch p of the groove 2 is selected in a range of from 200 nm to 350 nm, and the ratio $w_g/p$ between the width $w_g$ of the groove 2 and the track pitch p is selected in a range of from 0.24 to 0.67.

Next, an example of a manufacturing process of such optical recording and reproducing medium will be described with reference to process diagrams that show an example of a manufacturing method of an optical recording and reproducing medium manufacturing stamper shown in FIGS. 3A to 3D.

In FIG. 3A, reference numeral 11 denotes a master substrate made of a suitable material such as glass. On this master substrate 11, there is coated a photoresist 12 having a high γ characteristic value, i.e., a γ characteristic value greater than 4.5. Then, the photoresist is treated by predetermined pattern exposure and developed with an optical recording apparatus, which will be described later on, and thereby a predetermined groove pattern 13 is formed. Thus, there is constructed an optical recording and reproducing medium manufacturing master 16 in which concave and convex patterns corresponding to the grooves of the optical recording and reproducing medium are formed. In FIG. 3A, reference letter $w_{gp}'$ denotes a width of the groove pattern 13.

Figure 3B:
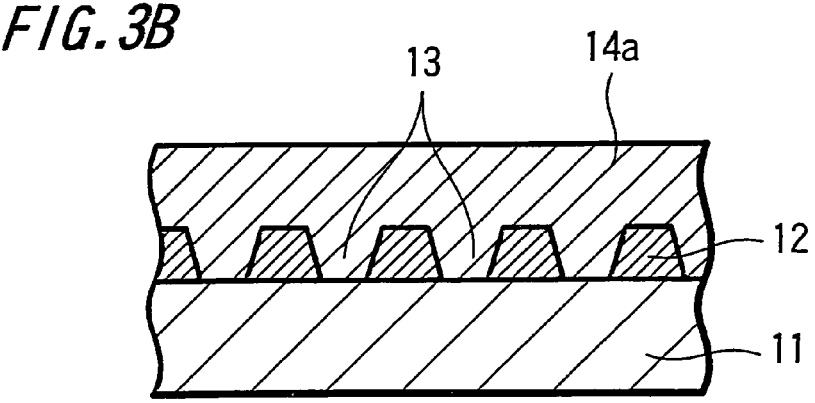

Then, as shown in FIG. 3B, a plated layer 14a made of a suitable material such as Ni is deposited on the whole surface of the photoresist 12 on which the groove pattern 13 is formed by using a nonelectrolytic plating method and an electrolytic plating method, for example.

Figure 3C:
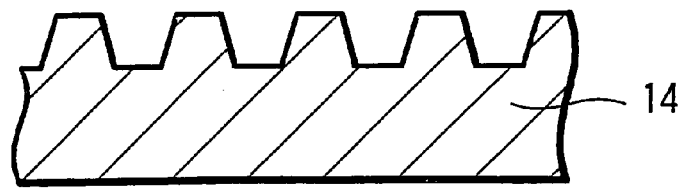

Thereafter, the plated layer 14a is released from the master substrate 11 and the photoresist 12 and thereby a stamper 14 is formed as shown in FIG. 3C.

Figure 3D:
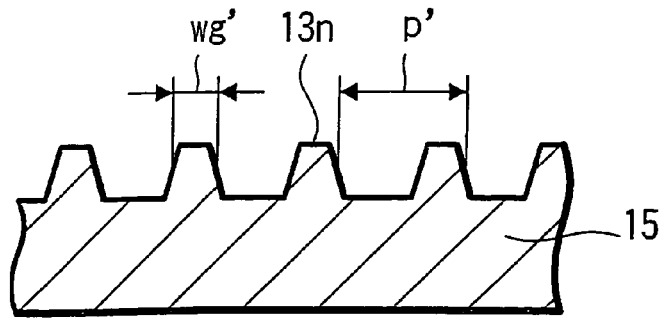

Then, the whole surface of this stamper 14 is etched by plasma etching in a RIE system, for example, which will be described later on, whereby an optical recording and reproducing manufacturing stamper 15 with a groove pattern 13n having a width $w_g'$ narrower than the width $w_{gp}'$ of the groove pattern 13 formed on the photoresist 12 can be obtained as shown in FIG. 3D. In FIG. 3D, reference letter p' denotes a track pitch.

In FIGS. 1 to 3, the width of the groove and groove pattern represents a mean value between the width of the groove bottom portion and the width of the open end of the upper portion of the groove when the groove-like shape comprising the groove and the groove pattern is trapezoid in shape. As shown in FIG. 3D, the groove pattern 13n is protruded like a convex-like protrusion in which concavities and convexities are inverted. The width $w_g'$ of this groove pattern 13n is shown as the width of the center portion of the inclined surface of the uneven portion comprising the convex portion. The track pitch p' shows the space between the center portions of the inclined surfaces of the uneven portions.

In this embodiment, as described above, desired very small uneven patterns could be formed at high accuracy by so-called high γ photoresist whose γ characteristic value is greater than 4.5.

Figure 4:
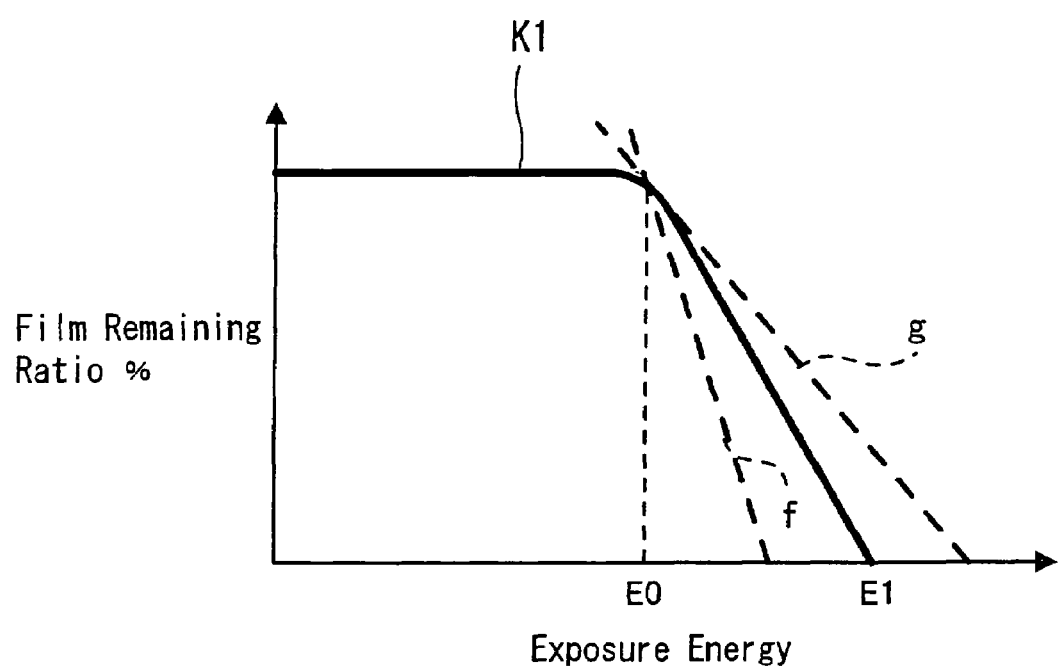
FIG. 4 is a diagram used to explain a γ characteristic value.

The γ characteristic value is expressed by an inclination of a linear inclined portion of a characteristic curve K1 that indicates a relationship between a film remaining ratio (film thickness obtained after development/coated film thickness) of the photoresist and exposure energy per unit area in FIG. 4. When the inclined angle of the inclined portion increases as shown by a broken line f, resolution increases. Conversely, when the inclined angle of the inclined portion decreases as shown by a broken line g, resolution decreases.

Assuming that $E_0$ represents minimum exposure energy that is required to expose the photoresist and that $E_1$ represents maximum exposure energy large enough to expose this photoresist film completely so that this photoresist film may vanish after development, then the γ characteristic value is expressed as:

$$\gamma = 1/(\log E_1 - \log E_0)$$

An ordinary γ characteristic value is approximately 2.7, for example, and when this gamma characteristic value is greater than 4, there can be obtained high resolution. According to the present invention, since a high resolution photoresist whose γ characteristic value is greater than 4.5 was used and the whole surface of the photoresist was treated by etching as described above, the track pitch p' of the groove pattern 13n could fall within a range of from 200 nm to 350 nm and the ratio $w_g'/p'$ between the width $w_g'$ of the groove pattern 13n and the track pitch p' could fall within a range of from 0.24 to 0.67.

The width $w_g'$ of the groove pattern 13n could fall within a range of from 47 nm to 235 nm.

Then, according to an injection molding method of molding the thus formed optical recording and reproducing medium manufacturing stamper 15 placed on a suitable means such as a mold by injection of resin or a so-called 2P (Photo-Polymerization) method for forming the substrate with desired uneven patterns transferred thereon by pressing the stamper 15 against a resin layer formed after a ultraviolet-curing resin has been coated on a substrate, as has been described so far with reference to FIG. 1, there can be obtained the optical recording and reproducing medium substrate 1 in which the groove 2 having the groove width w and the track pitch p substantially identical to the width $w_g'$ of the groove pattern and the track pitch p' in the stamper 15 is formed on the surface.

Next, the arrangement of the optical recording apparatus for exposing the above-mentioned photoresist with patterns will be described.

Figure 5:
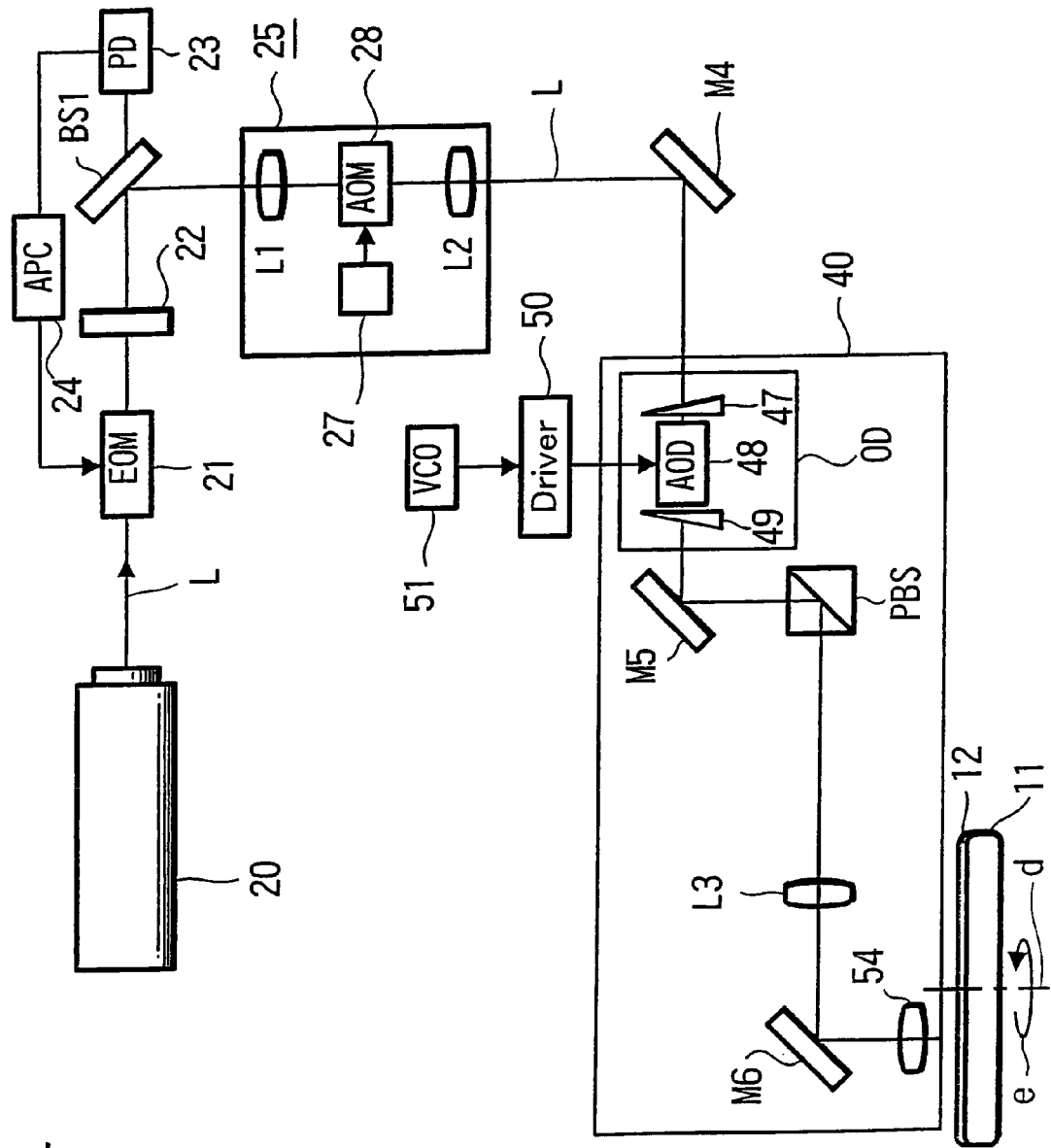
FIG. 5 is a schematic block diagram showing an arrangement of an example of an optical recording apparatus.

It is customary for the above-mentioned pattern exposure process to use a method in which an objective lens focuses laser beams to expose the photoresist on the master substrate. FIG. 5 is a schematic diagram showing an arrangement of an example of such optical recording apparatus.

In FIG. 5, reference numeral 20 denotes a light source such as a gas laser for emitting laser light with a short wavelength. Laser light emitted from the light source 20 passed through an electro-optic modulator (EOM; Electro Optical Modulator) 21 and an analyzer plate 22 and is partly reflected by a beam splitter BS1. Laser light that has passed through the beam splitter BS1 is detected and converted into an electrical signal by a photo-detector (PD; Photo Detector) 23, which is then supplied to an auto power control unit (APC; Auto Power Controller) 24. The APC generates a control signal based upon a signal supplied thereto from the photo-detector 23 and supplies this control signal to the electro-optic modulator 21. The electro-optic modulator 21 modulates intensity of recording laser light L emitted from the light source 20 to effect feedback control in response to a signal electric field of the control signal supplied from the auto power control unit 24 to thereby accurately stabilize or control power of laser light emitted from the electro-optic modulator 21.

Specifically, according to this method, power of light reflected by the beam splitter BS1 is controlled so that power can be changed in response to linear velocity that changes in the radius direction of the master substrate with the photoresist coated thereon while the master substrate is being rotated. Thus, the photoresist can be exposed with patterns while exposure energy per unit area is being held constant at high accuracy.

The laser light L reflected by the beam splitter BS1 is introduced into the modulation unit 25. In the modulation unit 25, laser light is focused by a lens L1 and an AOM modulator 28 composed of an AOM (acousto-optic modulation element) is located on the focal plane of such lens.

Ultrasonic waves corresponding to a recoding signal are inputted into this AOM modulator 28 from a driver 27 and the modulator can modulate intensity of laser light based upon the ultrasonic waves. Laser light is diffracted by a diffraction grating in the AO modulator 28 and only first-order diffracted light of diffracted light may pass through slits of the diffraction grating.

After the first-order diffracted light that was modulated in intensity has been focused by a lens L2, it is reflected by a mirror M4 and its traveling direction is bent 90°, thereby being horizontally introduced into a moving optical table 40 along the optical axis of the moving optical table 40.

When the groove is formed as a wobbling pattern groove, laser light that became incident on the moving optical table 40 is optically deflected by a deflection optical system OD, reflected by a mirror M5 and its traveling direction is again bent 90°, thereby being introduced into a polarizing beam splitter PBS.

When the optical recording and reproducing medium is manufactured, if laser light need not be optically deflected in order to form pits on a part of so-called recording area where grooves, for example, are formed or areas outside this recording area, e.g., inner peripheral portion, then laser light need not be optically deflected but is reflected by the mirror M5 so that reflected laser light is introduced into the polarizing beam splitter PBS. Thus, when pits are formed, a predetermined ON/OFF signal corresponding to a predetermined pattern is inputted to the modulation unit from the above-mentioned driver 27, whereby target groove patterns without wobble patterns or pit patterns can be formed.

The laser light of which traveling direction was again bent 90° by the polarizing beams splitter PBS is magnified so as to have a predetermined beam diameter by a magnifying lens L3, reflected by a mirror M6 and introduced into an objective lens 54. Then, this objective lens 54 focuses this laser light at the predetermined position of the photoresist 12 on the master substrate 11. The master substrate 11 is rotated by a rotation drive means, not shown, as shown by an arrow e. A dash-and-dot line d shows a center axis of the master substrate 11.

The recording laser light L is moved in the parallel direction by the moving optical table 40. As a result, a latent image corresponding to the uneven pattern is formed on the whole surface of the photoresist 12 in response to the trace along which the laser light irradiates the whole surface of the photoresist.

The deflection optical system OD is composed of a wedge prism 47, an acousto-optic deflector (AOD: Acousto Optical Deflector) 48 and a wedge prism 49. The laser light L is introduced through the wedge prism 47 into the acousto-optic deflector 48, and is optically deflected by this acousto-optic deflector 48 so as to correspond to a desired exposure pattern.

An acousto-optic element made of tellurium oxide ($TeO_2$) is suitable for use as an acousto-optic element used in this acousto-optic deflector 48. The laser light L that has been optically deflected by the acousto-optic deflector 48 is emitted from the deflection optical system OD through the wedge prism 49.

The wedge prisms 47, 49 can function such that the laser light L may become incident on the grating surface of the acousto-optic element of the acousto-optic deflector 48 so as to satisfy the Bragg condition and that height of laser beam can be prevented from being changed in the horizontal direction when the laser beam is optically deflected by the acousto-optic deflector. In other words, these wedge prisms 47, 49 and the acousto-optic deflector 48 are located in such a manner that the laser light L may become incident on the grating surface of the acousto-optic element of the acousto-optic deflector 48 so as to satisfy the Bragg condition and that height of laser light can be prevented from being changed in the horizontal direction when the laser light is emitted from the deflection optical system OD.

A driving driver 50 for driving the acousto-optic deflector 48 is attached to the acousto-optic deflector 48, and a high-frequency signal from a voltage-controlled oscillator (VCO: Voltage Controlled Oscillator) 51 is modulated based upon sine wave and supplied to this driving driver 50. When the photoresist is exposed, a signal corresponding to a desired exposure pattern is inputted into the driving driver 50 from the voltage-controlled oscillator 51 and the driving driver 50 drives the acousto-optic deflector 48 in response this signal, thereby resulting in the laser light L being optically deflected in response to a desired wobbling pattern.

Specifically, when address information is added to the groove by wobbling the groove at a frequency of 956 kHz, a high-frequency signal having a center frequency of 224 MHz is modulated into a sine wave signal by a control signal with a frequency of 956 kHz and supplied from the voltage-controlled oscillator 51 to the driving driver 50.

Then, the driving driver 50 drives the acousto-optic deflector 48 in response to this signal to change a Bragg angle of the acousto-optic element of this acousto-optic deflector 48, whereby laser light is optically deflected in response to a wobbling signal having a frequency of 956 kHz. As a result, the laser light can be optically deflected such that the position of the beam spot of the laser light focused on the photoresist may vibrate in the radius direction of the master substrate at the frequency of 956 kHz with amplitude of ±10 nm.

The polarizing beam splitter PBS may reflect S-polarized light and pass P-polarized light. Since the laser light that has been deflected optically is S-polarized light, it may be reflected by the PBS.

In the respective inventive examples which will follow, the numerical aperture NA of the objective lens was selected to be 0.85. The AOM of the acousto-optic modulator 28 was made of tellurium oxide. The signal supplied from the input terminal through the driver 27 to the modulation unit is a DC (direct current) signal of a constant level when grooves are formed.

With respect to the optical lenses of the modulation optical system 25, the focal length of the condenser lens L1 was selected to be 80 mm, the focal length of the collimator lens L2 was selected to be 100 mm, and the focal length of the magnifying lens L3 of the moving optical table 40 was selected to be 50 mm.

With respect to exposure conditions in the optical recording apparatus having the above-mentioned arrangement, recording was made at recording linear velocity of 4.447 m/s by a so-called CLV (Constant Linear Velocity) system in which linear velocity was made constant.

Novolac-based photoresist (y=5.1) manufactured by TOKYO OHKA KOGYO CO., LTD. was used as the photoresist whose γ characteristic value is greater than 4.5.

Then, this master substrate 11 is set on a turntable of a developer so that the photoresist 12 may look upward and rotated so that the surface of the master substrate 11 may become identical to the horizontal plane. In this state, the photoresist 12 is developed by developer to form the uneven pattern on the signal forming region based on a recording signal and thereby the master for manufacturing the optical recording and reproducing medium, which has been described with reference to FIG. 3A, is formed. Thereafter, the stamper 14 having the uneven pattern similar to that manufactured by the pattern exposure and the development process by the above-described optical recording apparatus is formed by the above-mentioned manufacturing processes shown in FIGS. 3B to 3C.

In the following respective inventive examples, after a conductive film made of an Ni deposited film has been formed on the optical recording and reproducing medium manufacturing master 16 by a suitable method such as nonelectrolyte plating, the resultant optical recording and reproducing medium manufacturing master was attached to an electroforming apparatus, and an Ni plated layer having a thickness of approximately 300±5 μm was formed on the conductive film by electroplating. Then, this plated layer was removed from the conductive film by a suitable means such as a cutter, and the stamper 14 was formed by removing the photoresist 12 from the signal forming surface of the Ni plated layer with suitable solution such as acetone.

Figure 6:
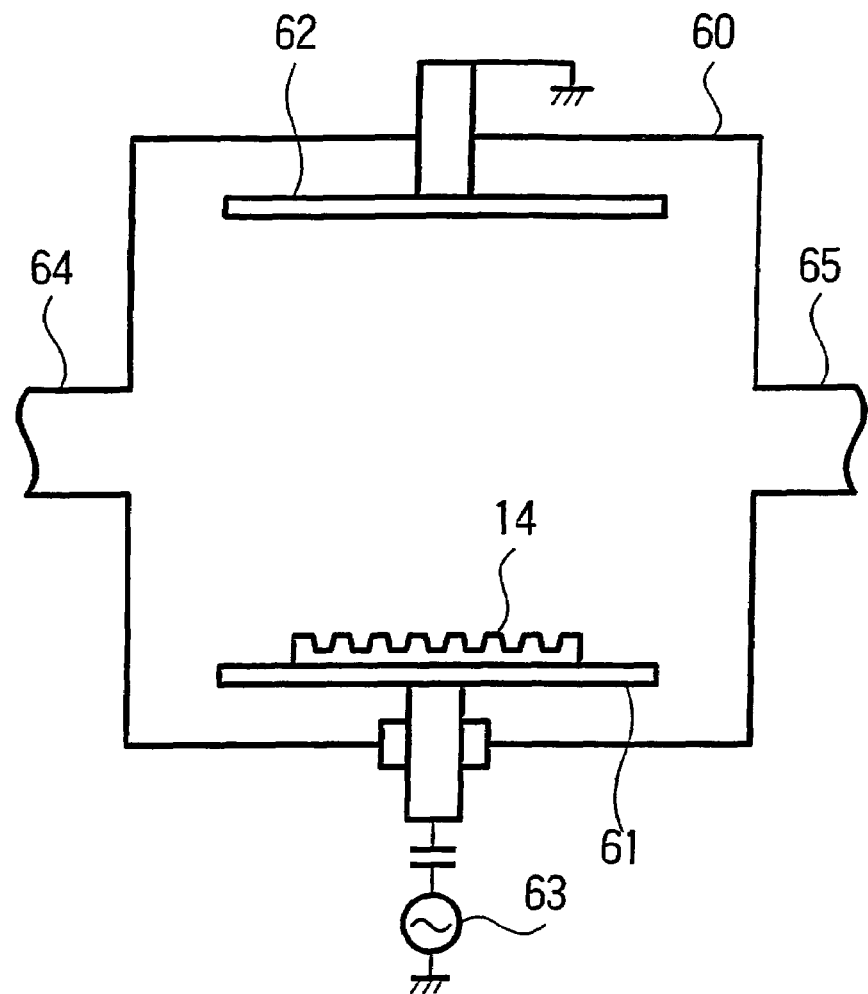
FIG. 6 is a schematic diagram showing an arrangement of an example of an etching system.

In the following respective inventive examples, this stamper 14 was etched by plasma etching with a diode parallel plate substrate cathode installation type etching system of which schematic arrangement is shown in FIG. 6. In FIG. 6, reference numeral 60 denotes an etching chamber in which a predetermined degree of vacuum can be held. A lower electrode (cathode) 61 on which the stamper 14 is held is provided at the lower portion of the etching chamber. An opposing electrode 62 opposing this lower electrode 61 is provided on the upper portion of the etching chamber 60. Reference numeral 63 denotes a high frequency power supply connected to the lower electrode 61. Reference numeral 64 denotes a gas introducing inlet, and reference numeral 65 denotes an exhaust outlet.

Although not shown, a gas supply source is coupled to the gas introducing inlet 64 through an MFC (mass flow controller), and an exhausting means such as a cryopump and a molecular turbo pump is coupled to the exhaust outlet 65 to hold the etching chamber at a predetermined degree of vacuum.

In the following respective inventive examples, in the condition in which RF power of the high frequency power supply was selected to be 150 W, high-frequency electric power of 13.56 MHz was applied to the cathode, Ar gas was used as etching gas and a gas pressure was held at 10 Pa and a treatment time was selected to be 3 minutes, an etching treatment was executed to manufacture an optical recording and reproducing medium manufacturing stamper 15 having a desired groove pattern width. An etching rate of Ni in this condition is about 10 nm/min.

In the following respective inventive examples according to the present invention, the groove width could be microminiaturized with an accuracy of approximately less than 1 nm by this etching treatment.

In particular, a surface roughness of its groove surface could be controlled so as to fall within a range of from 0.4 nm to 0.85 nm. Further, when an inclination angle of a groove side surface was controlled so as to fall within a range of from 15.4° to 40°, there could be obtained optical recording and reproducing mediums with satisfactory recording and reproducing characteristics as will be described in detail in the inventive examples which will be described later on.

Figure 7:
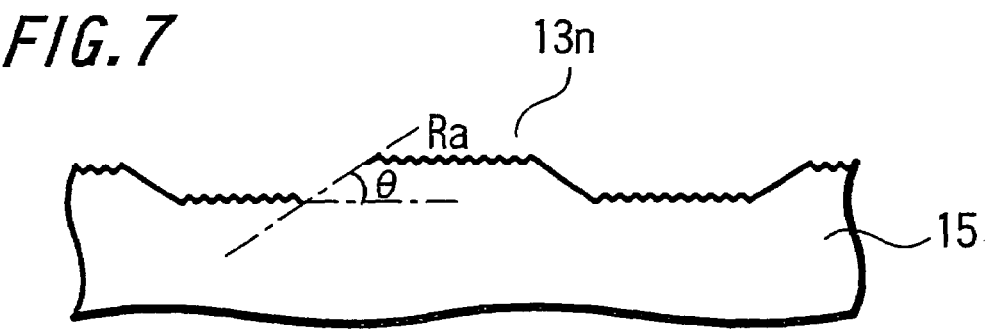
FIG. 7 is a diagram used to explain a surface roughness of a groove surface and an inclination angle of a groove side surface.

FIG. 7 is a schematic cross-sectional view showing an arrangement of an optical recording and reproducing medium substrate 1 transferred and molded from the stamper of which groove pattern was microminiaturized by this etching treatment. Ra shows a surface roughness of the groove surface. An inclination angle $\theta$ shows an angle formed between the side surface of the groove 2 and the flat surface that is the surface of the substrate 1 as shown in FIG. 7.

According to the present invention, as will be described in detail in the following inventive examples, when etching was carried out while the surface roughness and the inclination angle of the groove 2 were being controlled so as to fall within proper ranges, satisfactory recording and reproducing characteristics could be realized in the optical recording and reproducing mediums thus manufactured by using this substrate.

When etching conditions were selected such that $Ar+O_2$ gas was introduced as other etching gas, the introducing ratio of such etching gases was selected to be $Ar:O_2=9:1$, the total gas pressure was selected to be 10 Pa, the RF power was selected to be 150 W and the treatment time was selected to be 3 minutes similarly, proper etching treatment could be made at a similar etching rate of about 100 nm/min.

Next, a substrate having a thickness of 0.6 mm, for example, made of a transparent resin such as polycarbonate (refractive index is 1.59) was formed by using the stamper 15 of which groove pattern width has been thus microminiaturized by etching treatment in accordance with injection molding. As has been described so far with reference to FIG. 1, the reflective layer 3 made of a suitable material such as AlCu alloy, the first dielectric layer 4 made of a suitable material such as $ZnS$—$SiO_2$, the recording layer 5 made of a phase-change material such as GeSbTe alloy and GeInSbTe alloy and the second dielectric layer 6 made of a suitable material such as $ZnS$—$SiO_2$ are deposited on the signal forming surface of the substrate 1, in that order, by a suitable method such as sputtering. Thereafter, a ultraviolet-curing resin or the like is coated on the second dielectric layer 6 by a suitable method such as spin-coating and cured with irradiation of ultraviolet rays to form the protective layer 7 having a thickness of 0.6 mm, for example, thereby constructing the optical recording and reproducing medium 10. Thus, the optical recording and reproducing medium having the DVR type arrangement can be obtained by the above-described processes.

In the following respective inventive examples, while recording laser light, laser power and feed pitch in the above-mentioned optical recording apparatus were controlled and the etching treatment was made by the above etching system, there were manufactured respective stampers with different track pitches, different groove widths and different groove depths.

Figure 8:
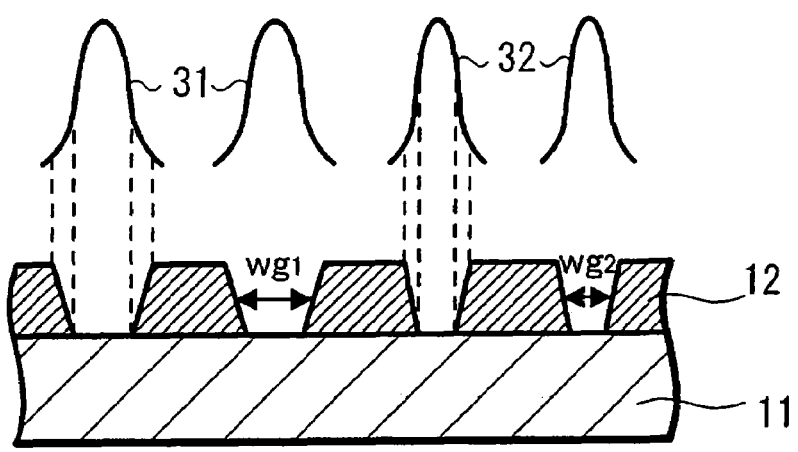
FIG. 8 is an explanatory diagram showing a relationship between a wavelength of recording laser light and a groove width.

The width of the groove pattern to be formed can be decreased by reducing the wavelength of the recording laser light. For example, as FIG. 8 shows schematically an example of intensity distribution of laser light and groove pattern, according to a He—Cd laser (wavelength is 442 nm) shown by a beam intensity distribution 31, for example, a groove width $w_{g1}$ can be made relatively wide. According to a Kr laser (wavelength is 351 nm) shown by a beam intensity distribution 32, a groove width $w_{g2}$ can be made relatively narrow. In FIG. 8, reference numeral 11 denotes a master substrate and reference numeral 12 denotes a photoresist.

INVENTIVE EXAMPLE 1

In the conditions in which a Kr laser (wavelength $\lambda=351$ nm) was used as a light source, laser power was controlled so as to fall within a range of from 76% to 100% where 0.6 mJ/m was maximum (100%) and a feed pitch was selected to be 0.350 µm, i.e., a track pitch was selected to be 0.35 µm (350 nm), an optical recording and reproducing medium manufacturing master was manufactured by effecting optical recording on the photoresist. The depth of the groove pattern was set to 15 nm by adjusting the film thickness of the photoresist. A stamper that has been transferred and molded from that master was set to a stamper A. A stamper of which groove width has been microminiaturized by further etching the stamper A under the above-mentioned conditions was set to a stamper AE.

INVENTIVE EXAMPLE 2

In the conditions in which a Kr laser was used as a light source, laser power was controlled so as to fall within a range of from 77% to 100% where 0.25 mJ/m was maximum (100%) and a feed pitch was selected to be 0.300 µm, i.e., a track pitch was selected to be 0.30 µm (300 nm), an optical recording and reproducing medium manufacturing master was manufactured by effecting optical recording on the photoresist. The depth of the groove pattern was set to 20 nm by adjusting the film thickness of the photoresist. A stamper that has been transferred and molded from that master was set to a stamper B. A stamper of which groove width has been microminiaturized by further etching the stamper B under the above-mentioned conditions was set to a stamper BE.

INVENTIVE EXAMPLE 3

In the conditions in which a quartic higher harmonic wave (wavelength $\lambda=266$ nm) of a YAG laser was used as a light source, laser power was controlled so as to fall within a range of from 75% to 100% where 0.15 mJ/m was maximum (100%) and a feed pitch was selected to be 0.250 µm, i.e., a track pitch was selected to be 0.25 µm (250 nm), an optical recording and reproducing medium manufacturing master was manufactured by effecting optical recording on the photoresist. The depth of the groove pattern was set to 25 nm by adjusting the film thickness of the photoresist. A stamper that has been transferred and molded from that master was set to a stamper C. A stamper of which groove width has been microminiaturized by further etching the stamper C under the above-mentioned conditions was set to a stamper CE.

INVENTIVE EXAMPLE 4

In the conditions in which a quartic higher harmonic wave (wavelength λ=266 nm) of a YAG laser was used as a light source, laser power was controlled so as to fall within a range of from 70% to 90% where 0.15 mJ/m was maximum (100%) and a feed pitch was selected to be 0.200 µm, i.e., a track pitch was selected to be 0.20 µm (200 nm), an optical recording and reproducing medium manufacturing master was manufactured by effecting optical recording on the photoresist. The depth of the groove pattern was set to 30 nm by adjusting the film thickness of the photoresist. A stamper that has been transferred and molded from that master was set to a stamper D. A stamper of which groove width has been microminiaturized by further etching the stamper D under the above-mentioned conditions was set to a stamper DE.

Average values of groove widths, i.e., widths of the bottom portions of the grooves of the open ends of the grooves of the thus formed respective stampers A to D and the stampers AE to DE obtained after etching were measured and averaged to measure the groove widths by a scanning electron microscope (SEM; Scanning Electron Microscope). The following tables 3 to 6 show the thus obtained groove widths, the ratios between the groove width and the track pitch, the groove widths obtained after etching, the ratios between the groove width and the track pitch obtained after etching and the depths of the grooves, respectively.

TABLE 3

(Stampers A, AE; track pitch p = 350 nm)

| Power of rec. light | 76% | 80% | 85% | 90% | 95% | 100% |
|---|---|---|---|---|---|---|
| Groove width (nm) | 115 | 156 | 208 | 224 | 240 | 260 |
| Groove width/track pitch | 0.33 | 0.45 | 0.59 | 0.64 | 0.69 | 0.74 |
| Groove width (nm) obtained after etching (nm) | 87 | 129 | 180 | 198 | 213 | 235 |
| Groove width/track pitch obtained after etching | 0.25 | 0.37 | 0.51 | 0.57 | 0.61 | 0.67 |

TABLE 4

(Stampers B, BE; track pitch p = 300 nm)

| Power of rec. light | 77% | 80% | 85% | 90% | 95% | 100% |
|---|---|---|---|---|---|---|
| Groove width (nm) | 105 | 123 | 145 | 168 | 195 | 210 |
| Groove width/track pitch | 0.35 | 0.41 | 0.48 | 0.56 | 0.65 | 0.70 |

TABLE 4-continued (Stampers B, BE; track pitch p = 300 nm)

| Groove width (nm) obtained after etching | 77 | 95 | 114 | 139 | 167 | 181 |
|---|---|---|---|---|---|---|
| Groove width/track pitch obtained after etching | 0.26 | 0.32 | 0.38 | 0.46 | 0.56 | 0.60 |

TABLE 5

(Stampers C, CE; track pitch p = 250 nm)

| Power of rec. light | 75% | 80% | 85% | 90% | 95% | 100% |
|---|---|---|---|---|---|---|
| Groove width (nm) | 93 | 112 | 138 | 153 | 167 | 182 |
| Groove width/track pitch | 0.37 | 0.45 | 0.55 | 0.61 | 0.67 | 0.73 |
| Groove width (nm) obtained after etching | 63 | 83 | 110 | 125 | 140 | 156 |
| Groove width/track pitch obtained after etching | 0.25 | 0.33 | 0.44 | 0.50 | 0.56 | 0.62 |

TABLE 6

(Stampers D, DE; track pitch p = 200 nm)

| Power of recording light | 70% | 75% | 80% | 85% | 90% |
|---|---|---|---|---|---|
| Groove width (nm) | 74 | 94 | 113 | 139 | 154 |
| Groove width/track pitch | 0.37 | 0.47 | 0.57 | 0.70 | 0.77 |
| Groove width (nm) obtained after etching | 47 | 67 | 87 | 114 | 129 |
| Groove width/track pitch obtained after etching | 0.24 | 0.34 | 0.44 | 0.57 | 0.65 |

As shown on the above-described table 3, in the stamper AE, the track pitch was selected to be 350 nm, the groove width was selected in a range of from 87 nm to 235 nm, and the ratio between the groove width and the track pitch was selected in a range of from 0.25 to 0.67. The depth of groove was selected to be 30 nm.

As shown on the above-described table 4, in the stamper BE, the track pitch was selected to be 300 nm, the groove width was selected in a range of from 77 nm to 181 nm, the ratio between the groove width and the track pitch was selected in a range of from 0.26 to 0.60. The depth of groove was selected to be 25 nm.

Further, as shown on the above-described table 5, in the stamper CE, the track pitch was selected to be 250 nm, the groove width was selected in a range of from 63 nm to 156 nm, and the ratio between the groove width and the track pitch was selected in a range of from 0.25 to 0.62. The depth of groove was 20 nm.

Furthermore, as shown on the above-described table 6, in the stamper DE, the track pitch was selected to be 200 nm, the groove width was selected in a range of from 47 nm to 129 nm, and the ratio between the groove width and the track pitch was selected in a range of from 0.24 to 0.65. The depth of groove was selected to be 15 nm.

When PtPd were deposited on the optical recording and reproducing medium substrates molded from these respective stampers by injection molding by sputtering and groove widths and groove widths obtained after etching were measured by the SEM, it was to be understood that the groove widths of these respective substrates were formed as similar widths to the groove widths in the respective stampers A to D, AE to DE and that these stampers can be transferred to the substrates satisfactorily.

The optical recording and reproducing mediums having the arrangement that has been described so far with reference to FIG. 2 were manufactured from the above-mentioned respective stampers thus made and their reproducing characteristics were tested by a test machine having a DVR arrangement equipped with an optical system having an objective lens with a numerical aperture NA=0.85.

It was confirmed that satisfactory push-pull signals were obtained from the respective optical recording and reproducing mediums formed from the stampers of the respective examples, stable tracking servos being executed. Moreover, the wobble signal could be stably reproduced from the wobbling grooves.

In the above-mentioned respective inventive examples, the lasers with the three recording wavelengths, i.e., 266 nm, 351 nm, 413 nm were used, the groove widths could be reduced much more by plasma etching, and hence the stampers and the optical recording and reproducing mediums whose groove widths are less than 150 nm could be manufactured. When the optical recording and reproducing mediums having the formats of the narrow track pitches as compared with the conventional track pitches wherein the track pitches were selected in a range of from 200 nm to 350 nm, the ratio between the groove width and the track pitch was selected in a range of from 0.24 to 0.67 and the depth of groove was selected in a range of from 15 nm to 30 nm, the stable reproduced signal could be obtained and the recording and reproducing characteristics could be held satisfactorily.

Further, the wobbling grooves could be formed and the wobble signal in which the address information was recorded could be reproduced stably.

Figure 9:
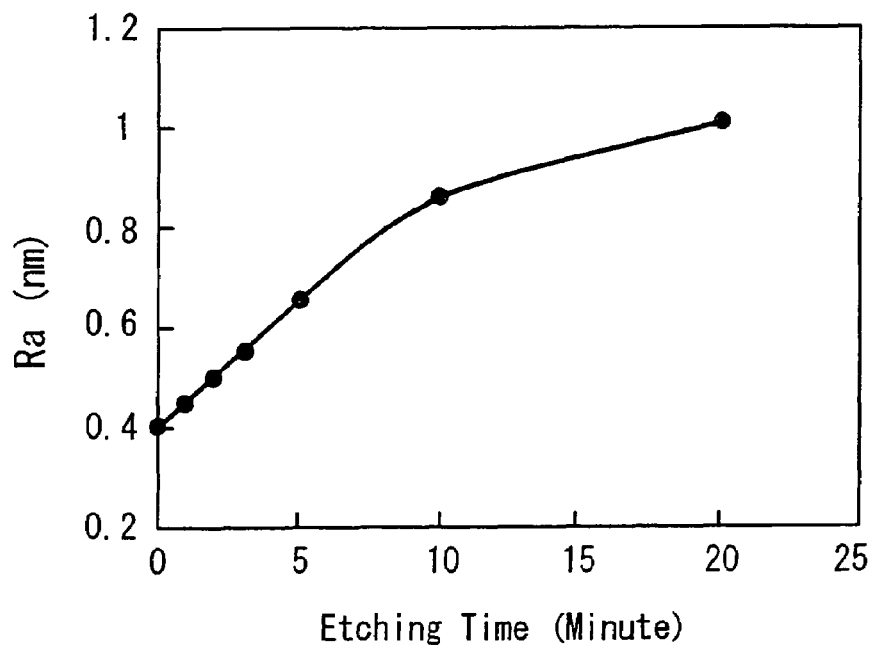
FIG. 9 is a diagram showing changes of the surface roughness of the groove surface relative to an etching time.
Figure 10:
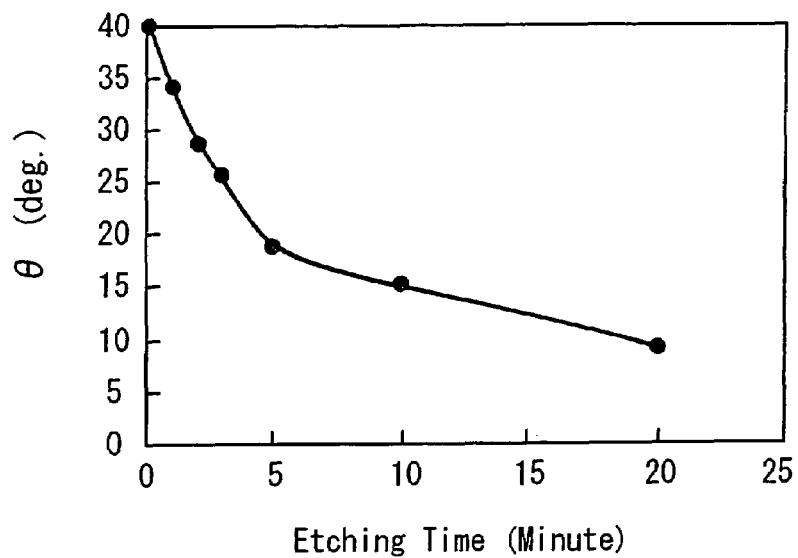
FIG. 10 is a diagram showing changes of the inclination angle of the groove side surface relative to an etching time.

Next, a stamper having a similar arrangement to that of the above-described stamper A was etched by the etching apparatus that had been described so far with reference to FIG. 6, and a surface roughness of a groove and an aging change of an inclination angle θ of a groove side surface were measured by an AFM (Atomic Force Microscope). Measured results are shown in FIGS. 9 and 10. It is to be understood that the surface roughness Ra is being progressively deteriorated from about 0.4 nm to 1 nm. Moreover, it is to be understood that the inclination angle θ is being progressively decreased from about 40° so that the groove side wall is changed to the flattened direction.

Stampers in which etching time was changed were manufactured, optical recording and reproducing medium substrates were formed from the respective stampers by an injection molding method, and reproducing characteristics of optical recording and reproducing mediums comprising a reflective layer, a first dielectric layer, a recording layer made of a phase-change material, a second dielectric layer and a protective layer deposited thereon were tested by a test machine having a DVR arrangement equipped with an optical system having a wavelength λ=406 nm and an objective lens having a numerical aperture NA=0.85. It was to be appreciated that when the surface roughness is selected in a range of from 0.4 to 0.85 nm and the inclination angle is selected in a range of from 15.4° to 40°, satisfactory recording and reproducing characteristics could be obtained.

The following table 7 shows measured results of the surface roughness Ra and the inclination angle θ relative to the etching treatment time and further shows good and bad recording and reproducing characteristics in the form of open circles and a cross.

TABLE 7

| Treatment time (minute) | Surface roughness (nm) | Angle (deg) | Recording and reproducing characteristics |
|---|---|---|---|
| 0 | 0.4 | 40 | ○ |
| 1 | 0.45 | 34 | ○ |
| 2 | 0.5 | 28.7 | ○ |
| 3 | 0.55 | 25.7 | ○ |
| 5 | 0.65 | 19 | ○ |
| 10 | 0.85 | 15.4 | ○ |
| 20 | 1 | 9.3 | X |

From the above-mentioned results, according to the present invention, the surface roughness of the groove manufactured by etching is selected in a range of from 0.4 to 0.85 nm and the inclination angle is selected in a range of from 15.4° to 40°.

While the embodiment of the present invention and the respective inventive examples have been described so far, the above-mentioned respective examples can be variously modified and changed based upon technical idea of the present invention.

Figure 11:
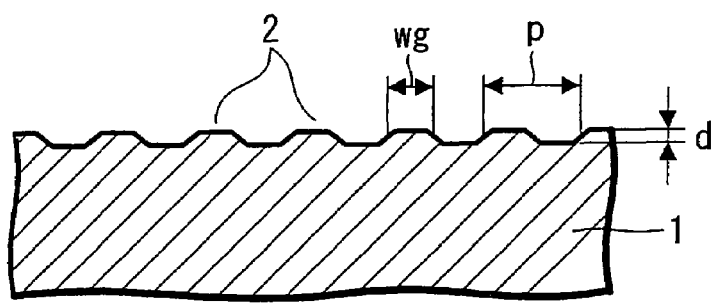
FIG. 11 is a schematic cross-sectional view showing arrangement of a main portion of other example of an optical recording and reproducing medium substrate according to the present invention.
Figure 12:
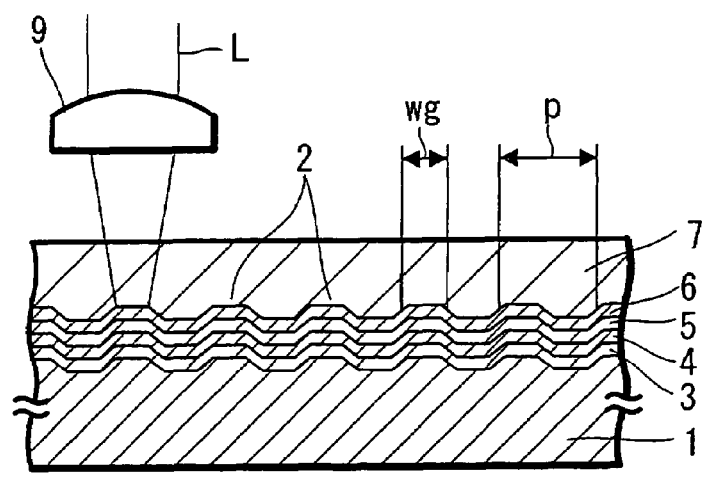
FIG. 12 is a schematic cross-sectional view showing an arrangement of a main portion of other example of an optical recording and reproducing medium.
Figure 13:
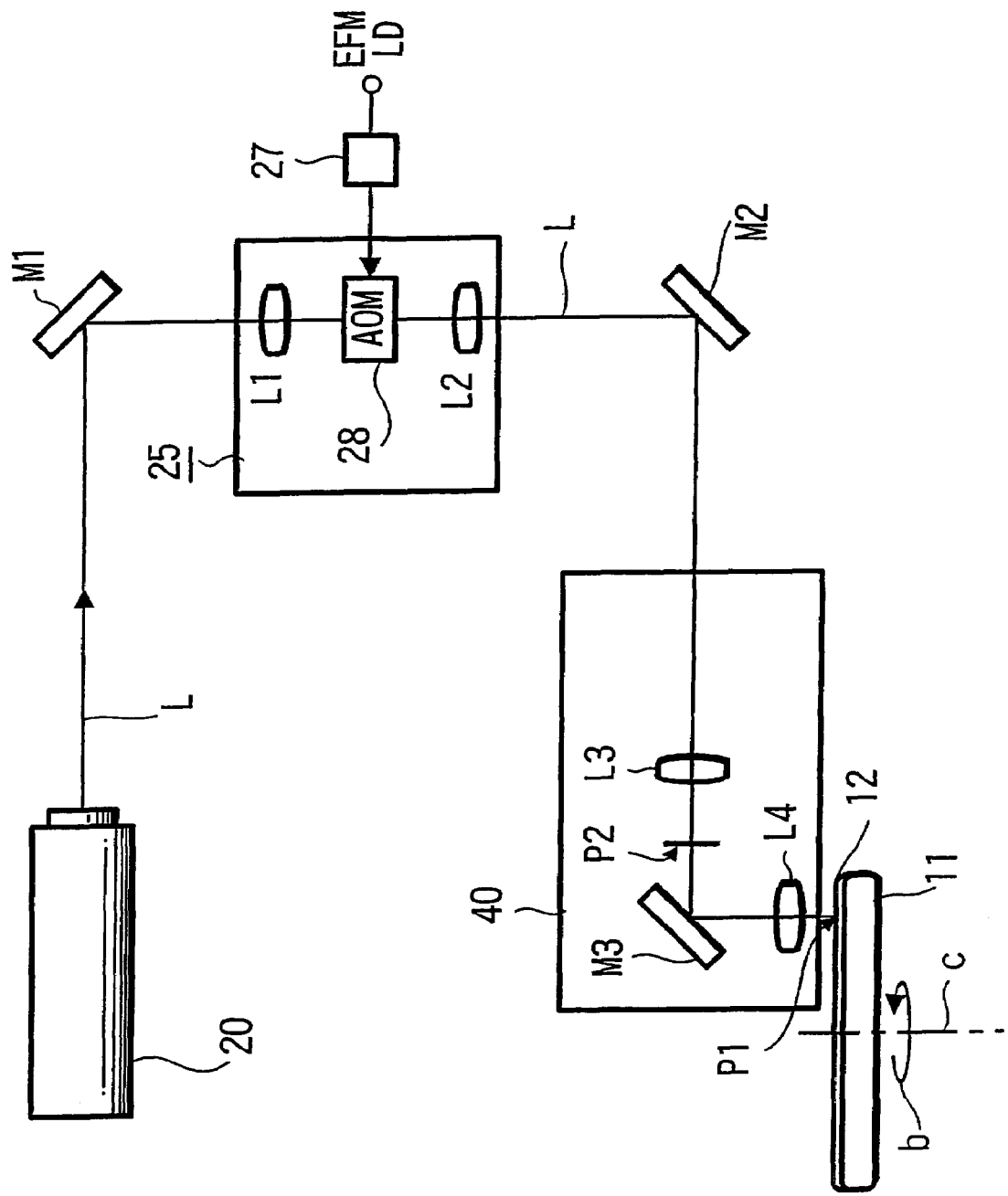
FIG. 13 is a schematic diagram showing an arrangement of an example of an optical recording apparatus.
Figure 14:
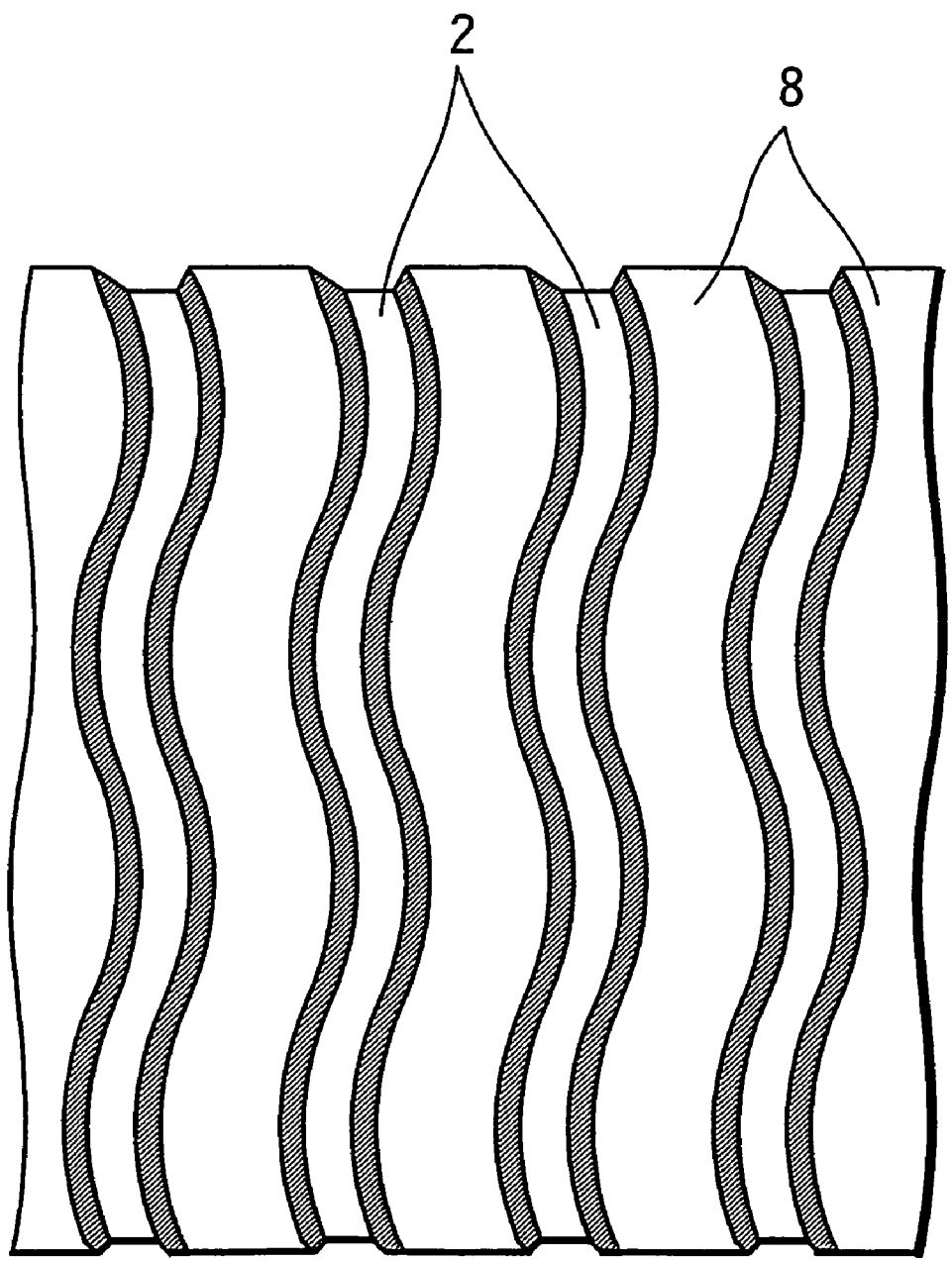
FIG. 14 is a plan view showing an arrangement of a main portion of an example of a conventional optical recording and reproducing medium.

For example, while the concave-like groove was formed on the 0.6 mm-thick substrate, the reflective layer, the recording layer and the like were deposited and the 0.6 mm-thick protective layer was deposited to construct the optical recording and reproducing medium and the optical recording and reproducing medium was recorded and/or reproduced by illumination of recording and/or reproducing light from the substrate side as described above in the above example, the present invention is not limited thereto and can of course be applied to the case in which a convex-like groove is formed on a 1.1 mm-thick optical recording and reproducing medium substrate 1 as FIG. 11, for example, shows a schematic cross-sectional arrangement of a main portion of an example thereof, a reflective layer, a recording layer and so on are deposited on this substrate 1 and a substantially 0.1 mm-thick protective layer is deposited thereon to construct an optical recording and reproducing medium 10 as FIG. 12 shows a schematic cross-sectional arrangement of its main portion and this optical recording and reproducing medium 10 is recorded and reproduced with illumination of recording and/or reproducing light. In FIG. 12, elements and parts overlapping those of FIG. 2 are denoted by identical reference numerals and therefore need not be described. In this case, after the stamper 15 has been formed by the aforementioned manufacturing processes shown in FIGS. 3A to 3D, a so-called mother stamper is transferred and formed from this stamper 15 and the substrate 1 is transferred and molded from this mother stamper by using a suitable material such as polycarbonate, thereby making it possible to obtain the optical recording and reproducing medium substrate 1 having the above-mentioned arrangement shown in FIGS. 11 and 12.

Also in this case, when the groove 2 is formed, this groove is optically recorded by an ordinary exposure method that exposes a groove pattern. Accordingly, when the groove 2 is formed as the wobble groove, the wobble groove has the ordinary groove pattern in which wobble signals are synchronized with each other at both sides of the groove 2 so that wobble information can be reproduced stably, thereby making it possible to avoid recording and reproducing characteristics from being deteriorated.

Moreover, in the present invention, various modifications and changes are possible. For example, recording wavelength to effect optical recording on the photoresist is not limited to 350 nm and 413 nm and recording laser light with other recording wavelength can be used.

Further, as the high γ photoresist of which γ characteristic value is greater than 4.5, novolac-based photoresist may be used and chemical amplification-type photoresist also can be used.

As the etching treatment, there can be used etching made by a reactive ion etching system and various etching systems. The gas for use with plasma etching is not limited to Ar gas and mixed gas into which $O_2$ gas is mixed into Ar gas and mixed gas into which other suitable gas such as $N_2$ gas and He gas is mixed can be used. Thus, when various material systems are in use, similar satisfactory results to those in the above-mentioned respective inventive examples can be obtained.

Further, the optical recording and reproducing medium is not limited to the above-mentioned optical recording and reproducing medium using the recording layer having the phase-change type arrangement, and the present invention can be applied to other optical recording and reproducing mediums using a magneto-optical recording layer or a dye material layer as a recording layer. In addition, material and arrangement can be varied, and it is needless to say that the present invention can be variously modified and changed without departing from the scope of the present invention.

Information is not limited to recording information, and the present invention can be applied to an optical recording and reproducing medium having function capable of recording and reproducing a signal or capable of recording and reproducing both of information and a signal, an optical recording and reproducing medium manufacturing stamper and its manufacturing method.

As described above, according to the present invention, since the patterning is made by the photoresist with the high γ characteristic value (greater than 4.5) and further the stamper is treated by the etching treatment, it is possible to form the optical recording and reproducing medium manufacturing stamper having the narrow groove width less than approximately 150 nm which is difficult to be realized by the manufacturing method based upon the ordinary optical recording and which has the track pitch ranging from 200 nm to 350 nm. Furthermore, the optical recording and reproducing medium substrate in which the groove shapes were transferred with satisfactory transfer property could be obtained by using this optical recording and reproducing medium manufacturing stamper.

According to the above-mentioned present invention, as compared with the case using the method of inverting and forming concavities and convexities by exposing the land portion between the grooves as in the above-described cited patent reference 2, recording and reproducing characteristics obtained when the wobbling groove is formed can be prevented from being deteriorated, and hence the wobble signal can be reproduced satisfactorily.

In particular, when the groove width is selected in a range of from 47 nm to 235 nm, the ratio of the groove width relative to the track pitch can be optimized and the groove shape by which the groove can be transferred and formed satisfactorily can be held, and hence there can be provided the optical recording and reproducing medium having satisfactory characteristics.

Further, when the surface roughness of the groove surface is selected in a range of from 0.4 nm to 0.85 nm and the inclination angle of the groove side surface is selected in a range of from 15.4° to 40°, it is possible to provide an optical recording and reproducing medium with satisfactory characteristics.

Furthermore, when the depth of the groove is selected in a range of from 15 nm to 30 nm, it is possible to provide an optical recording and reproducing medium with excellent recording and reproducing characteristics.

According to the present invention, in the thus formed optical recording and reproducing medium, the tracking servo signal can be reproduced stably. Further, the address information of the wobble signal required to form the wobbling groove can be reproduced stably and the recording and reproducing characteristics of the tracking servo signal and the wobble signal can be held satisfactorily. Then, when the numerical aperture NA of the objective lens for recording and reproducing light is selected in a range of 0.85±0.05 and recording and/or reproduction is made, it is possible to provide a practically high recording density optical recording and reproducing medium in which the recording and reproducing characteristics can be held satisfactorily as described above.

The invention claimed is:

1. An optical recording and reproducing medium substrate, comprising:
    a wobbling groove formed along a recording track;
    said wobbling groove having a track pitch p selected in a range from 200 nm to 350 nm;
    said wobbling groove having a width $w_g$;
    a ratio $w_g/p$ selected in a range from 0.24 to 0.67; and
    said wobbling groove having a land surface roughness selected in a range from 0.4 nm to 0.85 mm.

2. An optical recording and reproducing medium substrate according to claim 1, wherein said wobbling groove has a width selected in a range from 47 nm to 235 nm.

3. An optical recording and reproducing medium substrate according to claim 1, wherein said wobbling groove includes a groove side surface having an inclination angle selected in a range from 15.4° to 40°.

4. An optical recording and reproducing medium substrate according to claim 1, wherein said wobbling groove includes at least one of a depth and height selected in a range from 15 nm to 30 nm.

5. An optical recording and reproducing medium manufacturing stamper for molding an optical recording and reproducing medium substrate having a wobbling groove formed along a recording track, comprising:
    a groove pattern including a track pitch selected in a range of from 200 nm to 350 nm, a ratio $w_{g'}/p'$ between a width $w_{g'}$ of said groove pattern and a track pitch p' of said groove pattern selected in a range from 0.24 to 0.67, and a land surface roughness selected in a range from 0.4 nm to 0.85 nm.

6. An optical recording and reproducing medium manufacturing stamper according to claim 5, wherein said groove pattern width $w_{g'}$ is selected in a range from 47 nm to 235 nm.

7. An optical recording and reproducing medium manufacturing stamper according to claim 5, wherein said groove pattern has a groove side surface and an inclination angle selected in a range from 15.4° to 40°.

8. An optical recording and reproducing medium manufacturing stamper according to claim 5, wherein said groove pattern has at least one of a depth and a height selected in a range from 15 nm to 30 nm.

9. An optical recording and reproducing medium manufacturing stamper according to claim 5, wherein said optical recording and reproducing medium manufacturing stamper is formed such that an optical recording and reproducing medium manufacturing master is manufactured after a photoresist on a master substrate has been exposed with a pattern corresponding to a predetermined uneven pattern and developed, a stamper transferred from said optical recording and reproducing medium manufacturing master being formed by etching, said groove pattern width of said stamper being selected to be smaller than a width of a groove pattern of said optical recording and reproducing medium manufacturing master.

10. An optical recording and reproducing medium manufacturing stamper according to claim 9, wherein said stamper is etched by at least one of a plasma etching and a reactive ion etching.

11. An optical recording and reproducing medium manufacturing stamper according to claim 8, wherein said at least one of the plasma etching and the reactive ion etching uses at least one of an Ar gas and a gas which results from mixing oxygen gas into said Ar gas.

* * * * *